US011281746B2

(12) United States Patent
Tanaka et al.

(10) Patent No.: US 11,281,746 B2
(45) Date of Patent: Mar. 22, 2022

(54) ARITHMETIC OPERATION CIRCUIT, ARITHMETIC OPERATION METHOD, AND PROGRAM

(71) Applicant: Mitsubishi Electric Corporation, Tokyo (JP)

(72) Inventors: Susumu Tanaka, Tokyo (JP); Masashi Mori, Tokyo (JP); Kazushige Hashimoto, Amagasaki (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 94 days.

(21) Appl. No.: 16/633,845

(22) PCT Filed: Sep. 14, 2017

(86) PCT No.: PCT/JP2017/033225
§ 371 (c)(1),
(2) Date: Jan. 24, 2020

(87) PCT Pub. No.: WO2019/053835
PCT Pub. Date: Mar. 21, 2019

(65) Prior Publication Data
US 2021/0149983 A1 May 20, 2021

(51) Int. Cl.
*G06F 17/16* (2006.01)
*G06K 9/00* (2022.01)
*G06N 3/04* (2006.01)

(52) U.S. Cl.
CPC ......... *G06F 17/16* (2013.01); *G06K 9/00986* (2013.01); *G06N 3/0481* (2013.01)

(58) Field of Classification Search
CPC ..... G06F 17/16; G06F 17/10; G06K 9/00986; G06K 9/6271; G06N 3/0481; G06N 3/08; G06N 3/0464; G06N 3/063
(Continued)

(56) References Cited

U.S. PATENT DOCUMENTS

| 2011/0239032 | A1 | 9/2011 | Kato et al. | |
| 2018/0107630 | A1* | 4/2018 | Zhou | G06F 9/3895 |
| 2018/0330275 | A1* | 11/2018 | Jain | G06N 20/00 |

FOREIGN PATENT DOCUMENTS

| JP | H1141601 A | 2/1999 |
| JP | 2010134697 A | 6/2010 |

OTHER PUBLICATIONS

Office Action dated Mar. 23, 2021, issued in corresponding Japanese Patent Application No. 2019-541561, 4 pages including 2 pages of English translation.
(Continued)

*Primary Examiner* — Tan V Mai
(74) *Attorney, Agent, or Firm* — Buchanan Ingersoll & Rooney PC

(57) ABSTRACT

An arithmetic operation method for a convolutional layer in a neural network includes: generating a coefficient matrix by converting a kernel used in the convolutional layer such that the coefficient matrix is associated with an input vector obtained by expanding, into one column, a feature map input to the convolutional layer; searching for non-zero elements included in the coefficient matrix; assigning multiplications of the non-zero elements included in the coefficient matrix and corresponding elements of the input vector to a plurality of calculators with each of the multiplications being handled as a unit of process, so as to level out the numbers of units of process among the calculators, each of the calculators being capable of performing a process in parallel with one another; and sequentially performing, by the calculators, the assigned multiplications, and sequentially adding, by the calculators, results of the multiplications to corresponding elements of an output vector.

7 Claims, 9 Drawing Sheets

(58) Field of Classification Search
USPC .......................................................... 708/190
See application file for complete search history.

(56) References Cited

OTHER PUBLICATIONS

International Search Report (PCT/ISA/210), with translation, and Written Opinion (PCT/ISA/237) dated Nov. 28, 2017, by the Japan Patent Office as the International Searching Authority for International Application No. PCT/JP2017/033225.
Osoda, et al., "Vectorization and Parallelization Technique of Block ILU Preconditioning for Unstructural Problems", Transactions of the Information Processing Society of Japan, Nov. 2000, vol. 41, No. SIG8(HPS2), pp. 92-100 (w/ English Abstract).

* cited by examiner

FIG.8
(A) COMPARATIVE EXAMPLE
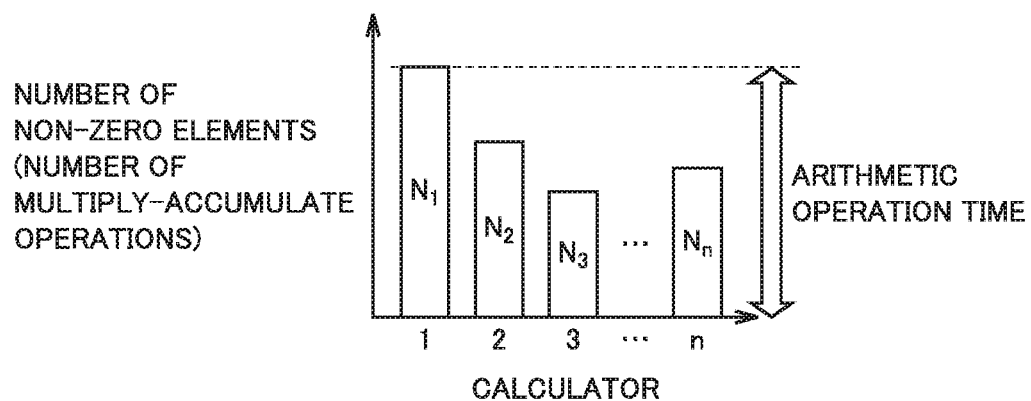
(B) PRESENT EMBODIMENT
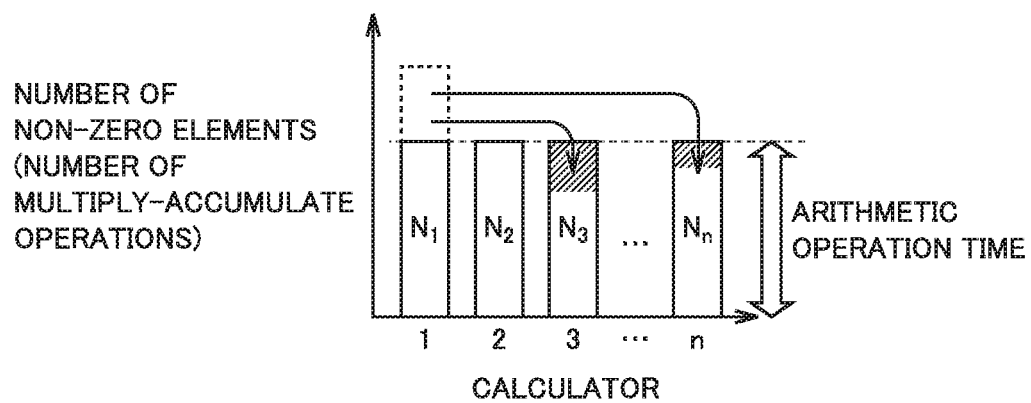

ARITHMETIC OPERATION CIRCUIT, ARITHMETIC OPERATION METHOD, AND PROGRAM

TECHNICAL FIELD

The present disclosure relates to an arithmetic operation circuit, an arithmetic operation method, and a program for performing the arithmetic operation method, and is used suitably for an arithmetic operation of a convolutional layer in the convolutional neural network, for example.

BACKGROUND ART

An arithmetic operation method called "convolutional neural network (CNN)" has been often used in many fields such as image processing for pattern recognition or the like, voiceprint analysis, and robotics. Generally, the CNN is constituted of: a convolutional layer that performs a convolutional operation; a pooling layer that calculates local statistics; and a fully connected layer. The convolutional layer generates an output feature map in the following manner: while scanning a kernel (also referred to as "filter") on an input feature map based on pixel(s) as a unit, a multiply-accumulate operation between a corresponding portion of the input feature map and the kernel is repeatedly performed and then a final multiply-accumulate operation result is nonlinearly converted.

Japanese Patent Laying-Open No. 2010-134697 (Patent Literature 1) discloses an arithmetic operation circuit for performing a convolutional operation by way of parallel processing. Specifically, the arithmetic operation circuit described in the patent literature performs a parallel arithmetic operation using respective numbers of multipliers and accumulators corresponding to the number of columns of the kernel.

CITATION LIST

Patent Literature

PTL 1: Japanese Patent Laying-Open No. 2010-134697

SUMMARY OF INVENTION

Technical Problem

In the arithmetic operation circuit described in the above-described patent literature, the feature map and the kernel are used for the arithmetic operation without modification. Hence, the number of times of repeating the arithmetic operation is increased, with the result that the process becomes slow, disadvantageously.

To address this, in order to shorten a process time, a method for performing an arithmetic operation after expanding the feature map or the kernel to one column is frequently used. According to this method, the convolutional operation results in a product of a coefficient matrix and a vector, i.e., a multiply-accumulate operation of an element of each row of the coefficient matrix and an element of the vector. For example, a parallel arithmetic operation can be performed by the number of multiply-accumulate calculators corresponding to the number of rows of the coefficient matrix.

Here, when the multiply-accumulate operation is simply performed by each multiply-accumulate calculator with 0 being included in the elements of the coefficient matrix, a time is consumed for wasteful arithmetic operations. Therefore, normally, the arithmetic operation is performed using the multiply-accumulate calculator with the zero elements of the coefficient matrix being excluded. However, the number of non-zero elements differs among the rows of the coefficient matrix. Even when the number of non-zero elements is small in the coefficient matrix as a whole, an entire process time is determined by a row having the largest number of non-zero elements. Accordingly, when there is only one row having a multiplicity of non-zero elements, the entire process time is determined by the multiply-accumulate operation in that row, with the result that the entire process time cannot be shorted as expected.

The present disclosure has been made in consideration of the above-described problem, and has an object to provide an arithmetic operation circuit and an arithmetic operation method, by each of which an entire process time can be shortened when performing a multiplication of a coefficient matrix including 0 in elements and a vector. It should be noted that each of the arithmetic operation circuit and the arithmetic operation method according to the present disclosure is used suitably for a convolutional operation in a CNN, but is applicable not only to the CNN but also other fields.

Solution to Problem

An arithmetic operation circuit according to one embodiment is to multiply, by an input vector from right, a coefficient matrix including non-zero elements and zero elements and to output an arithmetic operation result as an output vector. The arithmetic operation circuit includes: a control processor; and a plurality of calculators each capable of performing a process in parallel with one another. The control processor assigns multiplications of the non-zero elements included in the coefficient matrix and corresponding elements of the input vector to the calculators with each of the multiplications being handled as a unit of process, so as to level out the numbers of units of process among the calculators. The calculators sequentially perform the assigned multiplications, and sequentially add results of the multiplications to corresponding elements of the output vector.

Advantageous Effects of Invention

According to the above-described embodiment, the multiplications of the non-zero elements included in the coefficient matrix and the corresponding elements of the input vector are assigned to the calculators with each of the multiplications being handled as a unit of process, so as to level out the numbers of units of process among the calculators, whereby an entire process time can be shortened.

BRIEF DESCRIPTION OF DRAWINGS

FIG. 8 illustrates an effect of a first embodiment.

DESCRIPTION OF EMBODIMENTS

Figure 1:
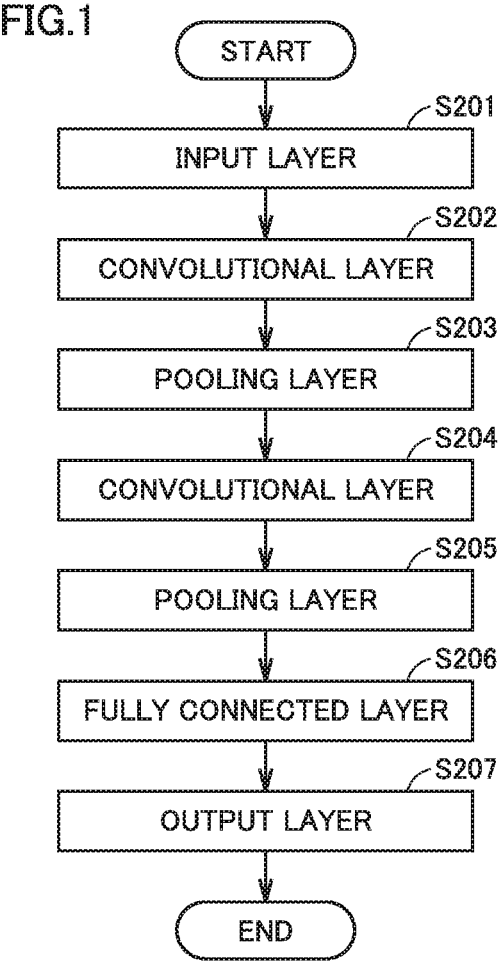
FIG. 1 is a flowchart showing an arithmetic operation process by a CNN.

The following describes each embodiment in detail with reference to figures. It should be noted that the same or corresponding components will be given the same reference characters and will not be described repeatedly.

First Embodiment

[CNN]

A CNN will be briefly described first. FIG. 1 is a flowchart showing an arithmetic operation process by the CNN.

With reference to FIG. 1, the CNN includes an input layer S201, convolutional layers S202, S204, pooling layers S203, S205, a fully connected layer S206, and an output layer S207.

Input layer S201 receives input of data to be processed, such as image data. Output layer S207 outputs a final result after the data processing. For ease of description, a combination of convolutional layer and pooling layer is repeated twice (S202, S203; S204, S205) in FIG. 1, but may be repeated a larger number of times.

The data input to the convolutional layer is referred to as "input feature map", and the data output from the convolutional layer is referred to as "output feature map". Each of convolutional layers S202, S204 repeatedly performs a multiply-accumulate operation of a corresponding portion of the input feature map and a kernel (also referred to as "filter") while scanning the kernel on the input feature map based on pixel(s) as a unit, and nonlinearly convert a final multiply-accumulate operation result, thereby generating the output feature map. An element (also referred to as "weight") of the kernel is determined by training in advance. Details of the convolutional operation will be described later with reference to FIG. 2.

Each of pooling layers S203, S205 performs an operation to collect elements of a local domain of the output feature map into one element so as to reduce a spatial size of the feature map. Each of pooling layers S203, S205 takes the maximum value of the local domain, or averages the elements included in the local domain, for example.

One or a plurality of fully connected layers S206 are provided adjacent to output layer S207. Each neuron of fully connected layer(s) S206 has a connection to all the neurons of an adjacent layer.

[Convolutional Operation]

Figure 2:
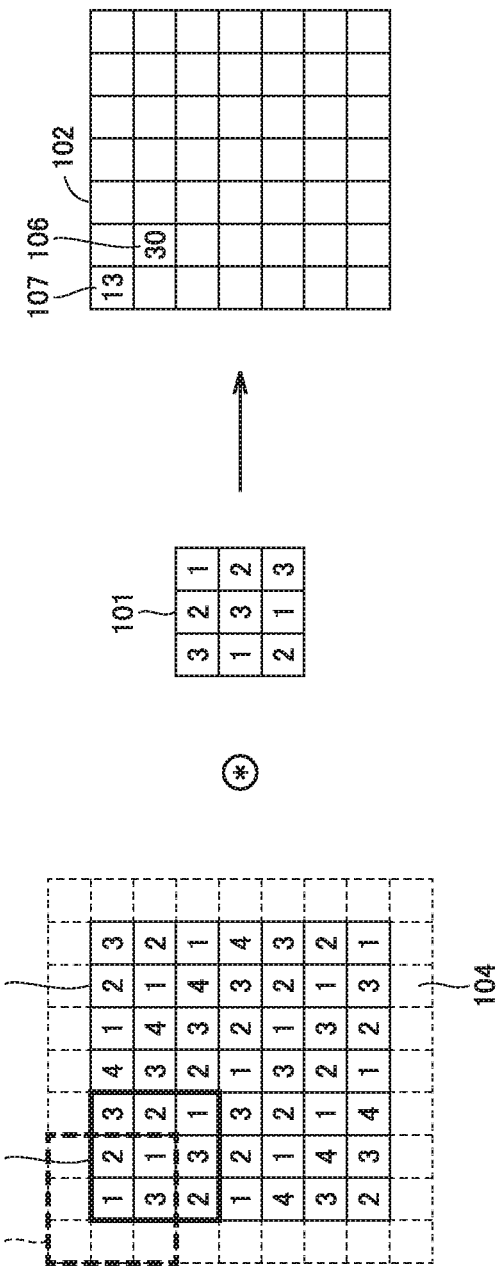
FIG. 2 illustrates a convolutional operation.

FIG. 2 illustrates the convolutional operation. As shown in FIG. 2, output data 102 is generated by a convolutional operation of a kernel 101 and input data 100 serving as the input feature map. Bias is added to each element of output data 102, and an activating function is also applied thereto, thereby generating the output feature map. As the activating function, a nonlinear function such as ReLU (Rectified Linear Unit) is used, for example.

For ease of description, in the example of FIG. 2, an input data size is set to (7, 7), and a kernel size is set to (3, 3). For adjustment of an output data size, surroundings 104 of input data 100 may be filled with fixed data (for example, 0). This is referred to as "padding". Padding with a width of 1 and a value of 0 is applied to input data 100 of FIG. 2.

In the convolutional operation, while sliding kernel 101 at a certain interval on input data 100 including the padding portions, elements of kernel 101 are multiplied by corresponding elements of input data 100 and a sum thereof is calculated. That is, a multiply-accumulate operation is performed. A result of the multiply-accumulate operation is stored as a corresponding element of output data 102. The interval at which kernel 101 is slid is referred to as "stride". In the case of FIG. 2, the stride is 1.

Specifically, when kernel 101 is disposed to correspond to a frame 103 indicated by a thick solid line of FIG. 2, a multiply-accumulate operation result of "30" is stored as a positionally corresponding element 106 of output data 102. When kernel 101 is disposed to correspond to a frame 105 indicated by a thick broken line of FIG. 2, a multiply-accumulate operation result of "13" is stored as a positionally corresponding element 107 of output data 102.

[Expansion of Feature Map and Kernel]

Figure 3:
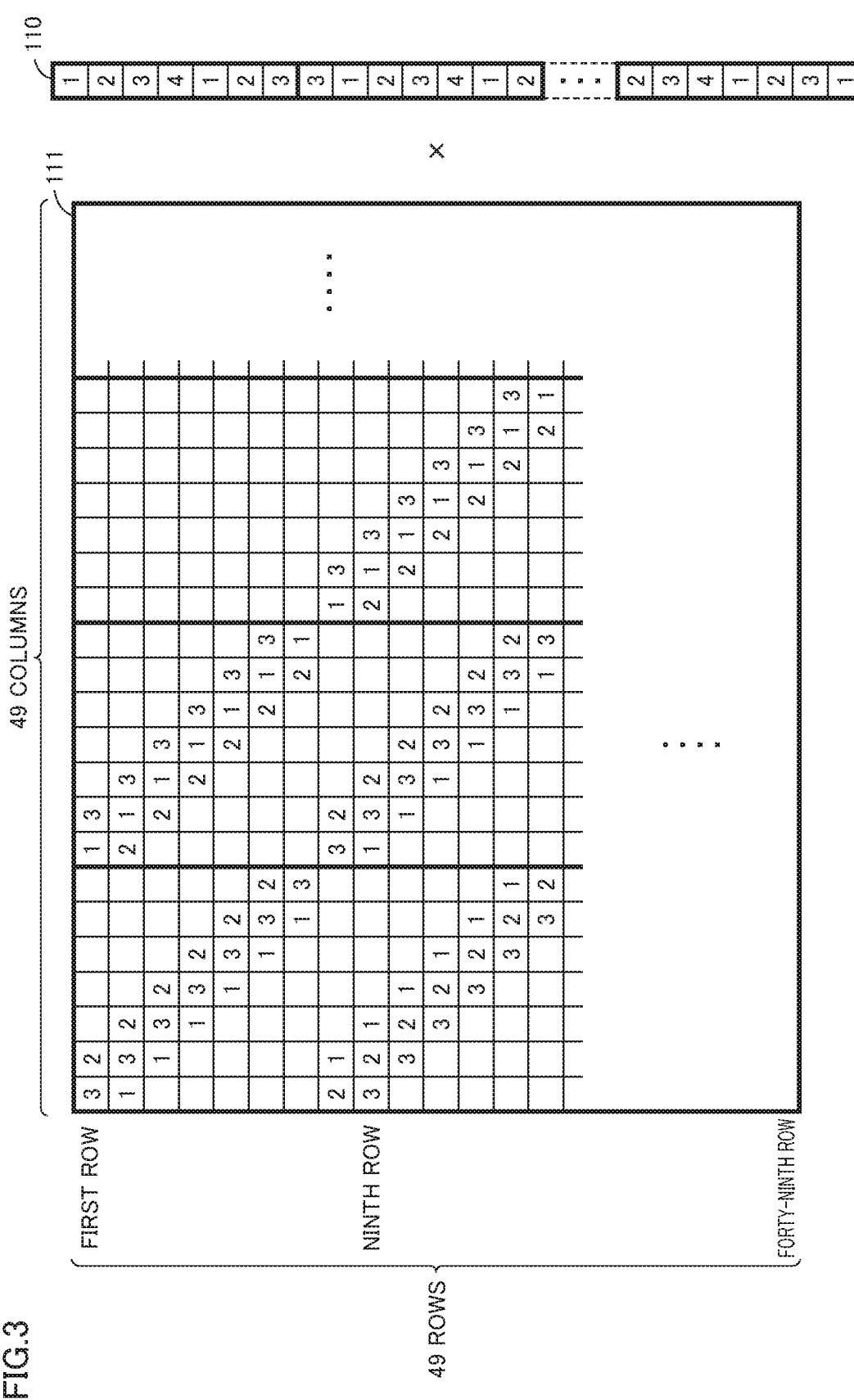
FIG. 3 illustrates expansion of a feature map and a kernel.

FIG. 3 illustrates expansion of the feature map and the kernel. In the case of the present embodiment, in order to shorten a process time of the convolutional operation, the feature map is expanded into one column by connecting the respective rows of the feature map to one another.

Specifically, with reference to FIG. 2 and FIG. 3, an input vector 110 of FIG. 3 is generated by connecting the respective rows of input data 100 of FIG. 2 to one another. The number of elements of input vector 110 corresponding to input data 100 is 7×7=49. Also, the rows of output data 102 of FIG. 2 are connected to one another to expand into one column. The number of elements of the output vector corresponding to output data 102 is also 49.

Kernel 101 of FIG. 2 is expanded into a matrix to generate an output vector corresponding to output data 102 of FIG. 2 when multiplied by input vector 110 from the right. Accordingly, a coefficient matrix 111 is generated. Coefficient matrix 111 has first to forty-ninth rows, and therefore has 49 rows. Coefficient matrix 111 has first to forty-ninth columns, and therefore has 49 columns. It should be noted that in coefficient matrix 111 shown in FIG. 3, elements in blank squares represent 0.

Specifically, the first row of coefficient matrix 111 is (3, 2, 0, 0, 0, 0, 0, 1, 3, 0, . . . , 0), and corresponds to the case where kernel 101 of FIG. 2 is disposed to correspond to frame 105 indicated by the thick broken line on feature map 100. By performing the multiply-accumulate operation of the first row of coefficient matrix 111 and input vector 110, data "13" to be stored as a positionally corresponding element 107 of output data 102 of FIG. 2 is generated.

Similarly, the ninth row of coefficient matrix 111 is (3, 2, 1, 0, 0, 0, 0, 1, 3, 2, 0, 0, 0, 0, 2, 1, 3, 0, . . . , 0), and corresponds to the case where kernel 101 of FIG. 2 is disposed to correspond to frame 103 indicated by the thick solid line on feature map 100. By performing the multiply-accumulate operation of the ninth row of coefficient matrix 111 and input vector 110, data "30" to be stored as a positionally corresponding element 106 of output data 102 of FIG. 2 is generated.

When no padding is applied in FIG. 2, input vector 110 corresponding to input data 100 is unchanged, and has 49 elements. Since the data size of output data 102 is (5, 5), the number of elements of an output vector corresponding to output data 102 is 5×5=25. Moreover, the number of rows of coefficient matrix 111 corresponding to kernel 101 is 25, and the number of columns is 49.

Generally, a matrix operation performed in the convolutional operation is expressed by a formula (1). That is, an output vector f of the convolutional operation is obtained by multiplying coefficient matrix A by input vector x from the right, and adding a bias vector b to an arithmetic operation result. Here, a feature of coefficient matrix A lies in that coefficient matrix A includes a comparatively large number of elements each having a value of 0.

$$f = A \cdot x + b \quad (1)$$

$$\begin{bmatrix} f_1 \\ f_2 \\ \vdots \\ f_n \end{bmatrix} = \begin{pmatrix} A_{11} & A_{12} & \cdots & A_{1m} \\ A_{21} & A_{22} & \cdots & A_{2m} \\ \vdots & \vdots & \ddots & \vdots \\ A_{n1} & A_{n2} & \cdots & A_{nm} \end{pmatrix} \begin{bmatrix} x_1 \\ x_2 \\ \vdots \\ x_m \end{bmatrix} + \begin{bmatrix} b_1 \\ b_2 \\ \vdots \\ b_n \end{bmatrix}$$

In this specification, the elements of output vector f are indicated as $f_1, \ldots, f_n$. The i-th element of output vector f is indicated as $f_i$ or $f(i)$. The elements of input vector x are indicated as $x_1, \ldots, x_m$. The j-th element of input vector x is indicated as $x_j$ or $x(j)$. The elements of bias vector b are indicated as $b_1, \ldots, b_n$. The element of i-th bias vector b is indicated as $b_i$ or $b(i)$. Moreover, coefficient matrix A is constituted of n rows of the first to n-th rows, and m columns of the first to m-th columns. An element of the i-th row and the j-th column in coefficient matrix A is indicated as $A_{ij}$ or $A(i, j)$.

[Configuration of Parallel Computer]

The matrix operation represented by the formula (1) above can be performed by a parallel computer including a plurality of calculators. The following describes an exemplary configuration of a general-purpose parallel computer. Unlike an example of FIG. 4, the matrix operation represented by the formula (1) above may be performed by an ASIC (Application Specific Integrated Circuit) including a plurality of calculators each capable of performing a process in parallel with one another.

Figure 4:
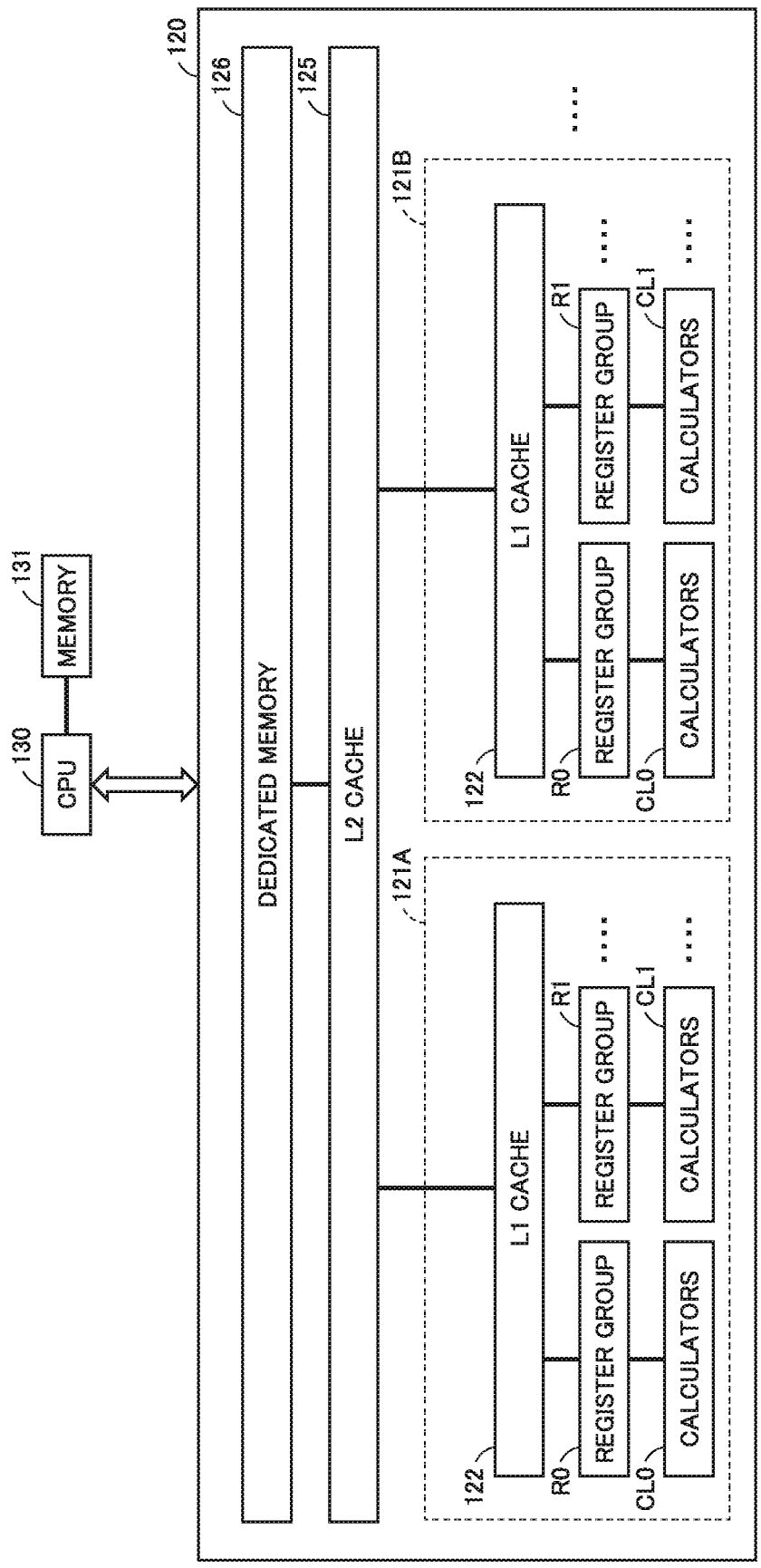
FIG. 4 is a block diagram showing an exemplary configuration of a parallel computer.

FIG. 4 is a block diagram showing an exemplary configuration of the parallel computer. With reference to FIG. 4, parallel computer 120 includes: a plurality of processing units 121A, 121B, . . . each including a plurality of calculators CL0, CL1, . . . ; a L2 cache memory (Level 2 Cache Memory) 125; and a dedicated memory 126.

Each processing unit 121 (121A, 121B, . . . ) includes: the plurality of calculators CL0, CL1 . . . ; register groups R0, R1 . . . corresponding to the respective calculators; and a L1 cache memory (Level 1 Cache Memory) 122. Calculators CL (CL0, CL1, . . . ) included in the same processing unit 121 shares L1 cache memory 122.

In the above-described configuration, the plurality of processing units 121A, 121B, . . . can execute a program in parallel with one another. Further, the plurality of calculators CL0, CL1, . . . of each processing unit 121 can execute a program in parallel with one another. It should be noted that the program may be provided via a network, or may be provided by a storage medium that stores the program in a non-transitory manner by using a magnetic or optical method, a semiconductor memory, or the like.

Parallel computer 120 may be connected to a CPU (Central Processing Unit) 130 via a high-speed interface. CPU 130 controls a whole of the program. In this case, data transfer by direct memory access may be permitted between a memory 131 for CPU 130 and a dedicated memory 126 of parallel computer 120. Unlike the configuration of FIG. 4, CPU 130 for control and memory 131 may be included in parallel computer 120.

[Overview of Procedure of Convolutional Operation]

The following describes an overview of a procedure of the convolutional operation, particularly, an overview of a procedure of the matrix operation represented by the formula (1).

Figure 5:
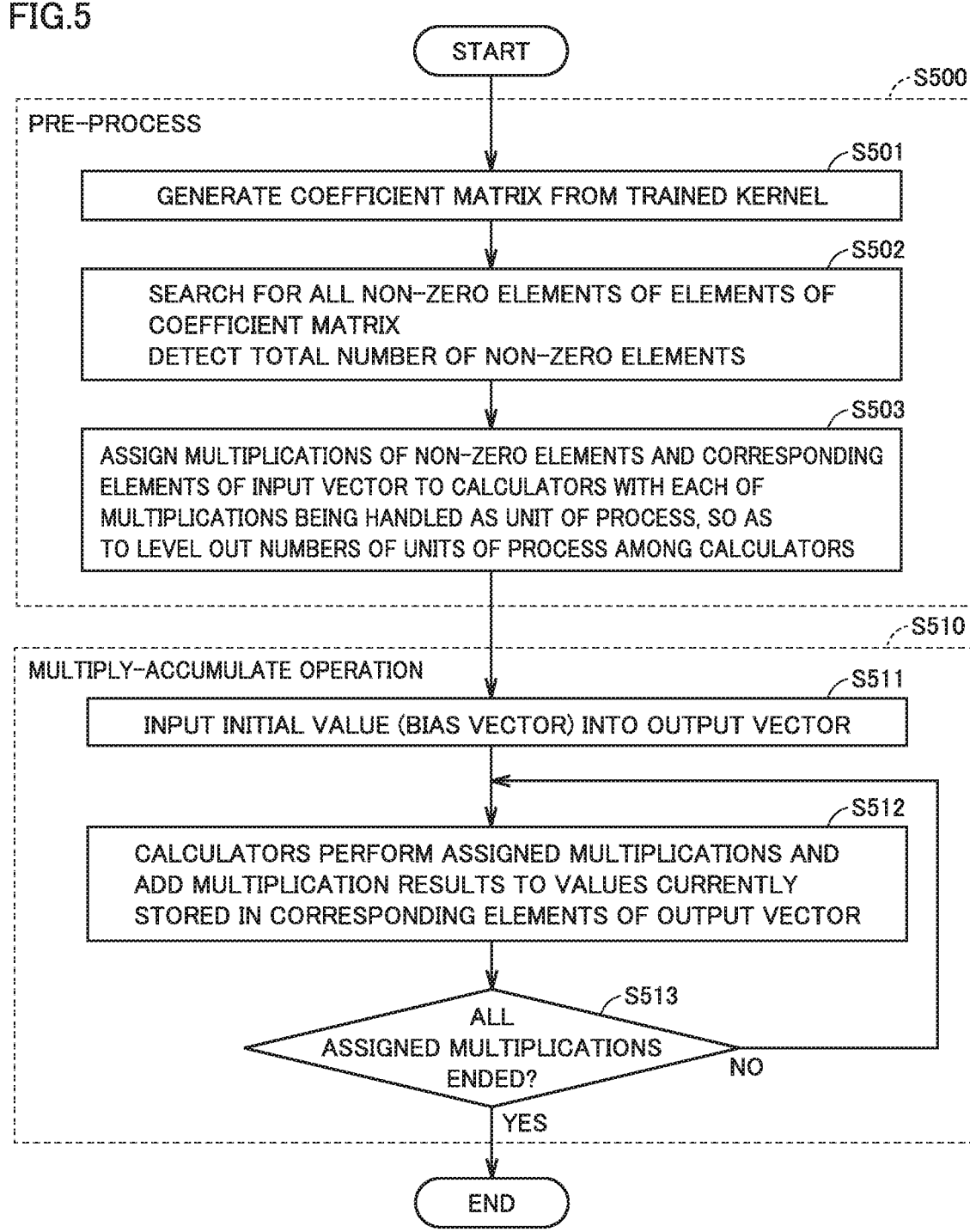
FIG. 5 is a flowchart showing an overview of a procedure of the convolutional operation.

FIG. 5 is a flowchart showing the overview of the procedure of the convolutional operation. It is assumed that each element of the kernel used for the convolutional operation has been already trained. As shown in FIG. 5, a convolutional operation process can be divided into: a pre-process S500 performed only once at the beginning; and a multiply-accumulate operation S510 repeated in response to input data. The pre-process can be performed by a general-purpose CPU (for example, CPU 130 of FIG. 4). On the other hand, the multiply-accumulate operation is mainly performed by parallel computer 120 of FIG. 4, and is generally controlled by CPU 130, for example.

In the pre-process stage, first, in a step S501, as illustrated in FIG. 2 and FIG. 3, a processor such as the CPU generates coefficient matrix A from the trained kernel. Generated coefficient matrix A is stored in a memory.

In a next step S502, the processor searches for all the non-zero elements of coefficient matrix A. A search result is stored into the memory. Accordingly, the total number of the non-zero elements included in coefficient matrix A is found. It is assumed that the input data is expanded into one column and is accordingly converted into the input vector.

In a next step S503, the processor assigns multiplications of the searched non-zero elements and corresponding elements of input vector x to calculators CL with each of the multiplications being handled as a unit of process, so as to level out the numbers of units of process among calculators CL included in parallel computer 120. Accordingly, process times among the calculators can be made substantially equal to one another. In this way, the pre-process stage is ended.

In the next multiply-accumulate operation, first, in a step S511, bias vector b is input into output vector f as an initial value. It should be noted that bias vector b may be added to output vector f at the end of the multiply-accumulate operation.

In a next step S512, each calculator CL of parallel computer 120 sequentially performs the assigned multiplication. Calculator CL adds a multiplication result to a value currently stored as a corresponding element of output vector f That is, the multiplication result is sequentially added to the corresponding element of output vector f. Step S512 is repeated until all the assigned multiplications are ended (until YES is determined in step S513).

It should be noted that in each of steps S512, S513, it can be considered that the multiply-accumulate operation of each row of coefficient matrix A and input vector x can be broken into unit multiply-accumulate operations for the sake of execution. Here, each of the unit multiply-accumulate operations is constituted of: a multiplication of one non-zero element of coefficient matrix A and a corresponding element of the input vector; and an addition of a multiplication result to a corresponding element of output vector f.

The following describes a brief specific example thereof. For example, it is assumed that in coefficient matrix A of the formula (1), n=m and only diagonal elements are non-zero elements. Moreover, it is assumed that the total number of calculators CL is n. In this case, the i-th ($1 \leq i \leq n$) calculator CL performs a multiplication of $A_{ii}$ and $x_i$, and adds a multiplication result to bias value $b_i$ currently stored as element $f_i$ of output vector f.

As another example, it is assumed that in coefficient matrix A of the formula (1), only elements $A_{11}$ to $A_{1m}$ of the first row are non-zero elements. Moreover, it is also assumed that the total number of calculators CL is m. In this case, the i-th (1≤i≤m) calculator CL performs an arithmetic operation of $A_{1i} \cdot x_i$, and adds an arithmetic operation result to a value currently stored as first element $f_1$ of output vector f. In this case, since the addition operations of calculators CL conflict with one another, exclusive control is performed. For example, first calculator CL adds the arithmetic operation result of $A_{11} \cdot x_1$ to initial value $b_1$ of element $f_1$ of output vector f. After end of this addition operation, second calculator CL adds an arithmetic operation result of $A_{12} \cdot x_2$ to $b_1 + A_{11} \cdot x_1$ currently stored as element $f_1$ of output vector f. Thereafter, the addition operation is sequentially repeated in the same manner.

[Details of Procedure of Convolutional Operation]

Figure 6:
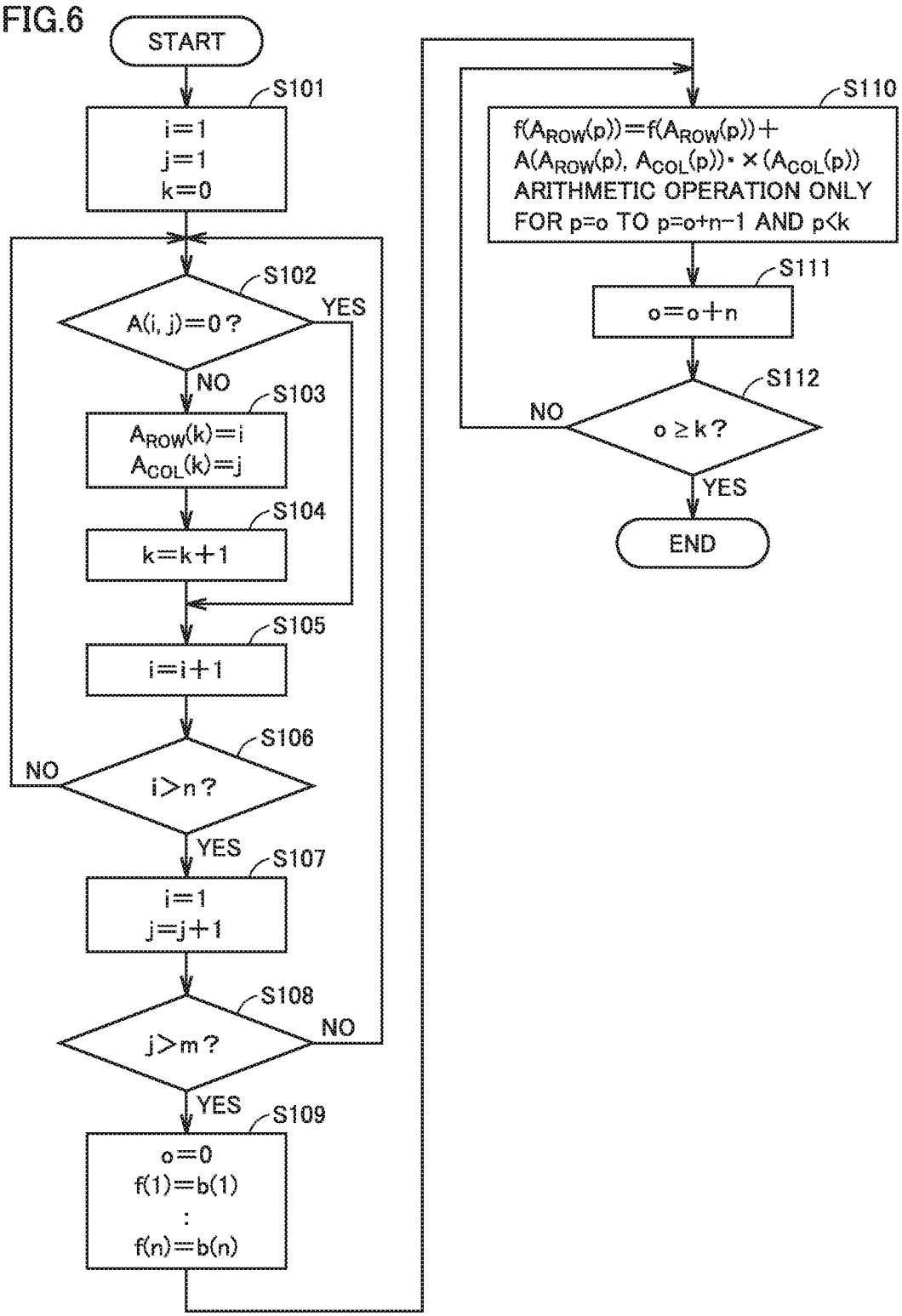
FIG. 6 is a flowchart showing details of the procedure of the convolutional operation.

FIG. 6 is a flowchart showing details of the procedure of the convolutional operation.

With reference to FIG. 6, a step S101 to a step S108 correspond to the pre-process of step S500 of FIG. 5.

First, variables are initialized in step S101. Specifically, the processor initializes both a row direction variable i and a column direction variable j to 1, and initializes the number k of non-zero elements (i.e., the number of unit multiply-accumulate operations) to 0.

In next step S102, whether or not an element is a non-zero element is determined. Specifically, the processor checks the value of an element A(i, j) of coefficient matrix A. When the value is 0, element A(i, j) is an element not targeted for the multiply-accumulate operation. Hence, the process proceeds to step S105 for counting up row direction variable i. On the other hand, when the value of element A(i, j) is not 0, element A(i, j) is an element targeted for the multiply-accumulate operation. Hence, the processor proceeds the process to step S103 for storing the non-zero element.

In step S103, a pointer to the searched non-zero element is stored. Specifically, in order to store the pointer to element A(i, j) targeted for the multiply-accumulate operation, the processor stores row direction variable i into a row number storing array $A_{ROW}(k)$, and stores column direction variable j into a column number storing array $A_{COL}(k)$.

In next step S104, the number k of non-zero elements is counted up. Specifically, the processor increments variable k indicating the number of non-zero elements.

In next step S105, the processor increments row direction variable i in order to check the next row.

In next step S106, in order to transition the process to the next column when a process for one column is completed, whether or not the process for one column of the coefficient matrix has been completed is determined. Specifically, by comparing row direction variable i with the number n of rows of the coefficient matrix, the processor determines whether or not the process for the present column has been completed. When row direction variable i is larger than the number n of rows, the processor determines that the process for the present column has been completed. In order to perform a process for the next column, the processor proceeds the process to step S107 for updating column direction variable j. On the other hand, when row direction variable i is not larger than the number n of rows, the processor determines that the process for the present column has not been completed yet. In order to perform a process for the next row, the processor proceeds the process to step S102 for determining whether or not the element is a non-zero element.

In step S107, the variables are updated for the process for the next column. Specifically, the processor initializes row direction variable i to 1 in order to perform the process from the first row of the next column. Further, the processor increments column direction variable j.

In next step S108, whether the process has been completed for all the columns is determined. Specifically, in order to determine whether or not the process has been completed for all the columns, by comparing column direction variable j with the number m of columns of coefficient matrix A, the processor determines whether or not the process has been completed for the entire matrix. When column direction variable j is larger than the number m of columns, the processor determines that the process has been completed for the entire matrix, and proceeds the process to step S109 for initializing variable f (corresponding to the output vector) of the multiply-accumulate operation. On the other hand, when column direction variable j is not larger than the number m of columns, the processor determines that a column having not been processed remains, and proceeds the process to step S102 for determining whether or not the element is a non-zero element.

Subsequent steps S109 to S112 correspond to multiply-accumulate operation S510 of FIG. 5. These steps are performed mainly by parallel computer 120 of FIG. 4, a dedicated ASIC capable of performing parallel arithmetic operation, or the like.

First, in step S109, each variable used for the multiply-accumulate operation is initialized. Specifically, the processor (for example, CPU 130 of FIG. 4), which controls the general operation, initializes an index variable o of each of the row number storing array and the column number storing array to 0. Further, the processor initializes output vectors f(1) to f(n) for outputting multiply-accumulate operation results to elements b(1) to b(n) of bias vector b, respectively.

In next step S110, the total number k of unit multiply-accumulate operations are performed sequentially using n multiply-accumulate calculators. Specifically, row number storing array $A_{ROW}(p)$ and column number storing array $A_{COL}(p)$ are used as a pointer to coefficient matrix A, and the p-th calculator CL performs the unit multiply-accumulate operation indicated by the following formula (2):

$$f(A_{ROW}(p))=f(A_{ROW}(p))+A(A_{ROW}(p),A_{COL}(p))\cdot x(A_{COL}(p)) \qquad (2)$$

Here, since the unit multiply-accumulate operations are performed in parallel using the n calculators, variable p in the formula (2) above has n values in a range from p=o to p=o+n−1. Further, since the multiply-accumulate operations are not performed to exceed the number k of non-zero elements, a multiply-accumulate operation is performed only when p<k is satisfied.

In next step S111, the variable for the multiply-accumulate operations is counted up. Specifically, the processor for control increments, by the number n of the calculators, index variable o of each of row number storing array $A_{ROW}(p)$ and column value storing array $A_{COL}(p)$ so as to prepare for next n multiply-accumulate operations.

In next step S112, whether or not all the unit multiply-accumulate operations have been completed is determined. Specifically, by comparing index variable o of each of the row number storing array and the column number storing array with the number k of non-zero elements, the processor for control determines whether or not the multiply-accumulate operations for all the non-zero elements have been completed. When index variable o of each of the row number storing array and the column number storing array is more than or equal to the number k of non-zero elements, the processor for control determines that all the multiply-accumulate operations have been completed, and ends the multiply-accumulate operation process. On the other hand, when index variable o of each of the row number storing array and the column number storing array is not more than or equal to the number k of non-zero elements, the processor for control proceeds the process to step S110 for performing the multiply-accumulate operation in order to perform remaining multiply-accumulate operations.

It should be noted that in the above-described procedure of the arithmetic operation, the check for the non-zero elements of coefficient matrix A is performed in order of the row and the column, but may be performed in order of the column and the row. Moreover, the total number of calculators CL is equal to the number n of rows, but may be equal to the number m of columns or may be set to any number.

Figure 7:
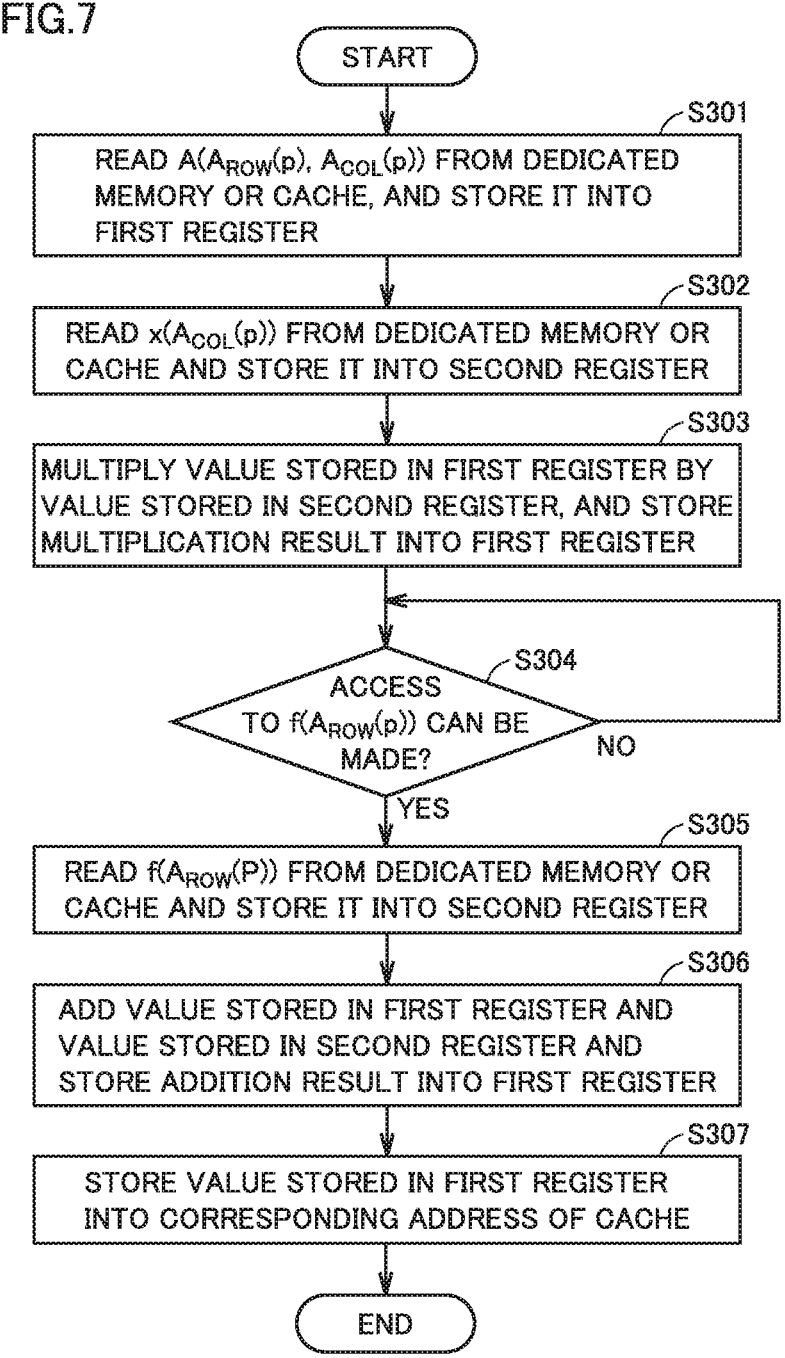
FIG. 7 is a flowchart showing an exemplary procedure of performing a unit multiply-accumulate operation in each calculator of the parallel computer of FIG. 4.

FIG. 7 is a flowchart showing an exemplary procedure of performing the unit multiply-accumulate operation in each calculator of the parallel computer of FIG. 4. It should be noted that in the procedure described below, a first register and a second register are included in register group R corresponding to each calculator CL.

In a step S301, calculator CL reads a corresponding element $A(A_{ROW}(p), A_{COL}(p))$ of the coefficient matrix from dedicated memory 126, L1 cache memory 122, or L2 cache memory 125, and stores it into its corresponding first register.

In a next step S302, calculator CL reads a corresponding element $x(A_{COL}(p))$ of the input vector from dedicated memory 126, L1 cache memory 122, or L2 cache memory 125, and stores it into its corresponding second register. It should be noted that step S302 may be performed simultaneously with step S301, or may be performed before step S301.

In a next step S303, calculator CL multiplies the value stored in the first register by the value stored in the second register, and stores a multiplication result into the first register, for example.

Subsequent steps will be performed when access to corresponding element $f(A_{ROW}(p))$ of the output vector can be made, i.e., when there is no conflict (YES in step S304).

First, in a step S305, calculator CL reads $fs(A_{ROW}(p))$ from dedicated memory 126, L1 cache memory 122, or L2 cache memory 125, and stores it into the second register.

In a next step S306, the value stored in the first register (i.e., the arithmetic operation result of step S303) and the value stored in the second register are added to each other and an addition result is stored into the first register, for example.

In a next step S307, calculator CL stores the value (i.e., the arithmetic operation result of step S306) stored in the first register, into a corresponding address of L1 cache memory 122. In this way, the unit multiply-accumulate operation is completed.

[Specific Example of Convolutional Operation]

With reference to exemplary numerical values, the following describes the procedure of the convolutional operation of FIG. 6 more in detail. Specifically, coefficient matrix A, input vector x, and bias vector b are set as in the following formula (3):

$$f = A \cdot x + b = \begin{pmatrix} 1 & 1 & 1 & 0 \\ 0 & 1 & 1 & 0 \\ 0 & 0 & 1 & 0 \\ 0 & 0 & 0 & 1 \end{pmatrix} \begin{bmatrix} 1 \\ 2 \\ 3 \\ 4 \end{bmatrix} + \begin{bmatrix} 4 \\ 3 \\ 2 \\ 1 \end{bmatrix} \quad (3)$$

If each row of the above-described matrix operation is performed individually by a corresponding calculator CL, four arithmetic operations shown in the following formula (4) are assigned to four calculators, respectively.

$$\left.\begin{aligned} f(1) &= 1 \cdot 1 + 1 \cdot 2 + 1 \cdot 3 + 4 \\ f(2) &= 1 \cdot 2 + 1 \cdot 3 + 3 \\ f(3) &= 1 \cdot 3 + 2 \\ f(4) &= 1 \cdot 4 + 1 \end{aligned}\right\} \quad (4)$$

Therefore, in this case, the number of arithmetic operations of the first calculator is the largest, whereas the number of arithmetic operations of each of the third and fourth calculators is the smallest. The entire process time is determined by an arithmetic operation time of the first calculator.

On the other hand, when the exemplary numerical values of the formula (3) are applied to steps S101 to S108 of FIG. 6 of the present embodiment, row number storing array $A_{ROW}(p)$ and column number storing array $A_{COL}(p)$ are as described in the following Table 1:

TABLE 1

| | Values of $A_{ROW}(p)$ and $A_{COL}(p)$ | | | | | | |
|---|---|---|---|---|---|---|---|
| p | 0 | 1 | 2 | 3 | 4 | 5 | 6 |
| $A_{ROW}$ | 1 | 1 | 2 | 1 | 2 | 3 | 4 |
| $A_{COL}$ | 1 | 2 | 2 | 3 | 3 | 3 | 4 |

For the sake of reference, index p of Table 1 above is denoted as a superscript in coefficient matrix A as indicated in the following formula (5). As shown in the formula (5), the total number of the non-zero elements, i.e., the total number of the unit multiply-accumulate operations, is 7.

$$f = A \cdot x + b = \begin{pmatrix} ^01 & ^11 & ^31 & 0 \\ 0 & ^21 & ^41 & 0 \\ 0 & 0 & ^51 & 0 \\ 0 & 0 & 0 & ^61 \end{pmatrix} \begin{bmatrix} 1 \\ 2 \\ 3 \\ 4 \end{bmatrix} + \begin{bmatrix} 4 \\ 3 \\ 2 \\ 1 \end{bmatrix} \quad (5)$$

Based on row number storing array $A_{ROW}(p)$ and column number storing array $A_{COL}(p)$, the unit multiply-accumulate operations to be performed in coefficient matrix A are expressed as in the following formulas (6.1) to (6.7):

$$f(1) = f(1) + A(1,1) \cdot x(1) \quad (6.1)$$

$$f(1) = f(1) + A(1,2) \cdot x(2) \quad (6.2)$$

$$f(2) = f(2) + A(2,2) \cdot x(2) \quad (6.3)$$

$$f(1) = f(1) + A(1,3) \cdot x(3) \quad (6.4)$$

$$f(2) = f(2) + A(2,3) \cdot x(3) \quad (6.5)$$

$$f(3) = f(3) + A(3,3) \cdot x(3) \quad (6.6)$$

$$f(4) = f(4) + A(4,4) \cdot x(4) \quad (6.7)$$

Since the number n of calculators CL is 4, the unit multiply-accumulate operations indicated by the formulas (6.1) to (6.4) are respectively performed in the first step by the zero-th to third calculators CL0 to CL3. In this case, for access to corresponding element f(1) of the output vector of each unit multiply-accumulate operation in the formula (6.1), the formula (6.2), and the formula (6.4), exclusive control is performed.

In a next step, the unit multiply-accumulate operations of the formulas (6.5) to (6.7) are respectively performed by zero-th to second calculators CL0 to CL2.

[Effect]

As described above, according to the first embodiment, the non-zero elements of coefficient matrix A are searched for, and the unit multiply-accumulate operations for the non-zero elements are allocated to the calculators based on the search result, and are performed by the calculators. Accordingly, the numbers of the processes for the unit multiply-accumulate operations among the calculators can be leveled out, whereby the multiply-accumulate operations by the plurality of calculators can be performed efficiently.

FIG. 8 illustrates an effect of the first embodiment. FIG. 8 (A) shows a comparative example and FIG. 8 (B) shows the case of the present embodiment.

FIG. 8 (A) shows a case where multiply-accumulate operations of respective rows of coefficient matrix A and input vector x are individually assigned to calculators CL. In this case, even when only the non-zero elements are calculated, if the number of non-zero elements differs among the rows of the coefficient matrix, the entire arithmetic operation time is determined by an arithmetic operation in calculator CL corresponding to the row having the largest number of non-zero elements.

In the case of the present embodiment shown in FIG. 8 (B), the unit multiply-accumulate operations are assigned to the calculators substantially equally. That is, parts of the unit multiply-accumulate operations performed by the calculator (1) and the calculator (2) in the case of FIG. 8 (A) are assigned to other calculators. Accordingly, the entire process time can be reduced.

Second Embodiment

In step S110 of the flowchart shown in FIG. 6, n calculators CL concurrently access coefficient matrix A having the n rows and the in columns by way of row number storing array $A_{ROW}(p)$ and column number storing array $A_{coL}(p)$. Accordingly, a process load becomes high for a large-scale coefficient matrix A. To address this, in a second embodiment, instead of accessing coefficient matrix A having the n rows and the m columns by way of row number storing array $A_{ROW}(p)$ and column number storing array $A_{coL}(p)$, a coefficient array A' (also referred to as "coefficient vector A") excluding the zero elements is defined newly and n calculators CL access coefficient array A'. Accordingly, intensive access to coefficient matrix A having the n rows and the m columns can be prevented.

Figure 9:
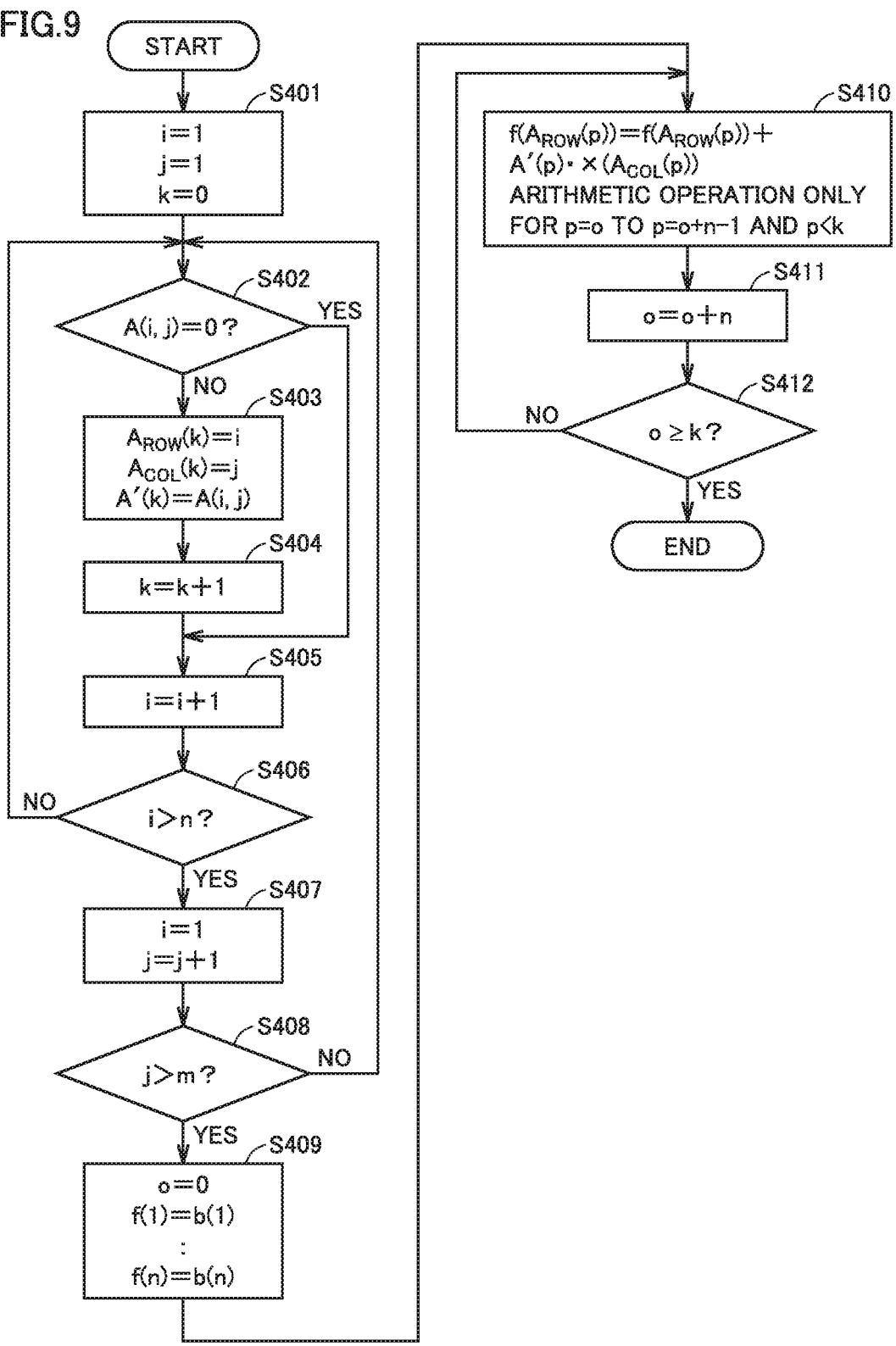
FIG. 9 is a flowchart showing a procedure of a convolutional operation according to a second embodiment.

FIG. 9 is a flowchart showing a procedure of a convolutional operation according to the second embodiment. Steps S401 to S412 of FIG. 9 respectively correspond to steps S101 to S112 of FIG. 6. However, parts of the processes in step S403 and step S412 are different therefrom. The following mainly describes steps S403 and S412 with different processes, and the steps with the same processes as those in FIG. 6 will not be repeatedly described.

With reference to FIG. 9, in step S403, the values of the non-zero elements included in coefficient matrix A and the row numbers and column numbers thereof are stored. Specifically, in order to store an element A(i, j) targeted for a multiply-accumulate operation, the processor stores a row direction variable i into row number storing array $A_{ROW}(k)$, stores a column direction variable j into column number storing array $A_{COL}(k)$, and stores element A(i, j) of coefficient matrix A into coefficient array A'(k).

Specifically, the following describes the case of the exemplary numerical values in the formula (3) above. In this case, coefficient array A' is given as described in the following Table 2.

TABLE 2

| | Value of A'(p) | | | | | | |
|---|---|---|---|---|---|---|---|
| p | 0 | 1 | 2 | 3 | 4 | 5 | 6 |
| A' | 1 | 1 | 1 | 1 | 1 | 1 | 1 |

In step S410, k unit multiply-accumulate operations in total are performed sequentially by n calculators CL. Specifically, row number storing array $A_{ROW}(p)$ and column number storing array $A_{COL}(p)$ are respectively used as pointers to output vector f and input vector x, and the p-th calculator CL performs a unit multiply-accumulate operation indicated by the following formula (7):

$$f(A_{ROW}(p))=f(A_{ROW}(p))+A'(p)\cdot x(A_{COL}(p)) \quad (7)$$

Here, since the unit multiply-accumulate operations are performed in parallel using the n calculators, variable p of the formula (7) takes n values in a range from p=o to p=o+n−1. Further, since the multiply-accumulate operations are not performed to exceed the number k of non-zero elements, a multiply-accumulate operation is performed only when p<k is satisfied.

As described above, according to the second embodiment, the same effect as that in the first embodiment can be exhibited, and intensive access to coefficient matrix A having the n rows and the m columns can be prevented.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

100: input data (input feature map); 101: kernel; 102: output data; 110, x: input vector; 111, A: coefficient matrix; 120: parallel computer; 121: processing unit; 122: L1 cache memory; 125: L2 cache memory; 126: dedicated memory; 130: CPU; 131: memory; A': coefficient array (coefficient vector); CL: calculator; R: register group; b: bias vector; f: output vector.

The invention claimed is:

1. An arithmetic operation circuit to multiply, by an input vector from right, a coefficient matrix including non-zero elements and zero elements and to output an arithmetic operation result as an output vector, the arithmetic operation circuit comprising:
   a control processor; and
   a plurality of calculators each capable of performing a process in parallel with one another, wherein
   the control processor assigns multiplications of the non-zero elements included in the coefficient matrix and corresponding elements of the input vector to the calculators with each of the multiplications being handled as a unit of process, so as to level out the numbers of units of process among the calculators, and the calculators sequentially perform the assigned multiplications, and sequentially add results of the multiplications to corresponding elements of the output vector, wherein:

the arithmetic operation circuit performs an arithmetic operation of a convolutional layer in a convolutional neural network, the input vector is obtained by expanding, into one column, a feature map input to the convolutional layer, and the coefficient matrix corresponds to a kernel used in the convolutional layer.

2. The arithmetic operation circuit according to claim 1, further comprising a coefficient vector to store only the non-zero elements extracted from the coefficient matrix, wherein the calculators perform the multiplications by using corresponding non-zero elements extracted from the coefficient vector.

3. An arithmetic operation method for a convolutional layer in a convolutional neural network, the arithmetic operation method comprising:

generating a coefficient matrix by converting a kernel used in the convolutional layer, such that the coefficient matrix is associated with an input vector obtained by expanding, into one column, a feature map input to the convolutional layer;

searching for non-zero elements included in the coefficient matrix;

assigning multiplications of the non-zero elements included in the coefficient matrix and corresponding elements of the input vector to a plurality of calculators with each of the multiplications being handled as a unit of process, so as to level out the numbers of units of process among the calculators, each of the calculators being capable of performing a process in parallel with one another; and sequentially performing, by the calculators, the assigned multiplications, and sequentially adding, by the calculators, results of the multiplications to corresponding elements of an output vector.

4. The arithmetic operation method according to claim 3, further comprising receiving an input of a bias vector as an initial value of the output vector.

5. The arithmetic operation method according to claim 4, further comprising: extracting only the non-zero elements included in the coefficient matrix; and storing the non-zero elements as a coefficient vector, wherein the calculators perform the multiplications by using corresponding non-zero elements extracted from the coefficient vector.

6. The arithmetic operation method according to claim 3, further comprising: extracting only the non-zero elements included in the coefficient matrix; and storing the non-zero elements as a coefficient vector, wherein the calculators perform the multiplications by using corresponding non-zero elements extracted from the coefficient vector.

7. A non-transitory computer readable medium having instruction stored thereon, wherein the instructions, when executed by a processor, cause the processor to perform the arithmetic operation method recited in claim 3.

* * * * *